Jan. 18, 1949.　　　　　F. B. AUBERT　　　　　2,459,356
ELECTRIC CONTROLLING SYSTEM
Filed June 19, 1946
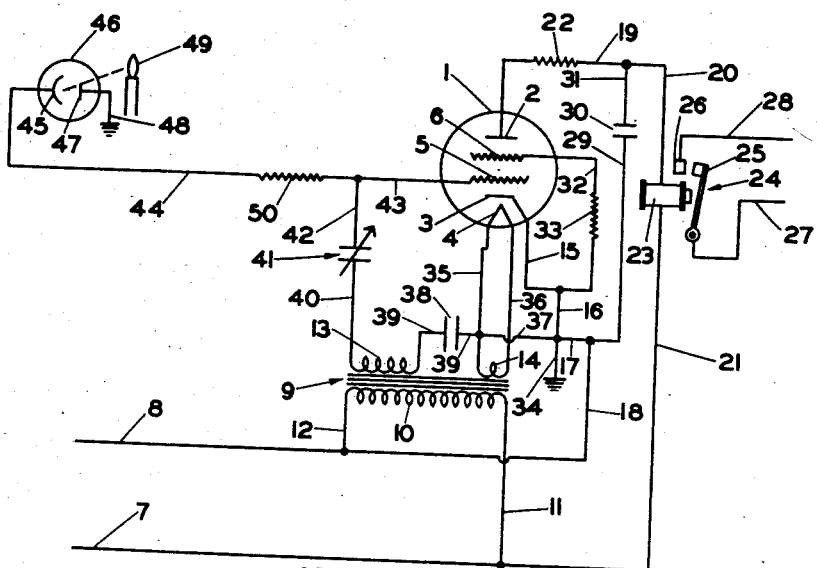
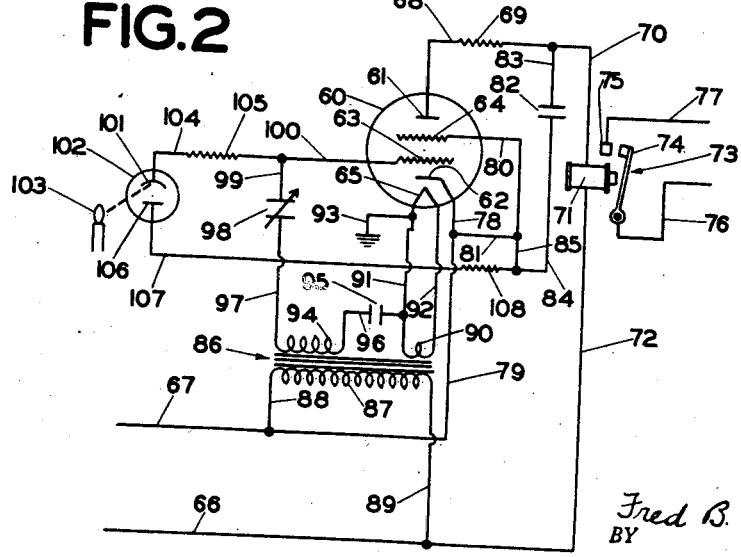
INVENTOR.
Fred B. Aubert
BY Andrew K. Foulds
his ATTORNEY Patented Jan. 18, 1949

2,459,356

UNITED STATES PATENT OFFICE 2,459,356

ELECTRIC CONTROLLING SYSTEM

Fred B. Aubert, Detroit, Mich.

Application June 19, 1946, Serial No. 677,873

2 Claims. (Cl. 250—41.5)

This invention relates to new and useful improvements in electric controlling systems and more particularly to such a system in which an electron tube is controlled by a photocell.

An object of this invention is to provide a system in which less energy is required on the photo cell than has heretofore been necessary to render the cell conductive so that the operating life of the cell is materially increased.

Another object is to provide a system having an electron tube controlled relay which is highly sensitive to photocell operation.

The invention consists in the cooperative arrangement of parts to be more fully described hereinafter and the novelty of which will be particularly pointed out and distinctly claimed.

In the accompanying drawings, to be taken as a part of this specification, there are fully and clearly illustrated several preferred embodiments of the invention, in which drawings, Figure 1 is a wiring diagram showing one form of the controlling system, and Fig. 2 is a wiring diagram showing another arrangement of the controlling system embodying the invention.

Referring to the drawings, Fig. 1, by characters of reference, the numeral 1 designates an electron tube, preferably of the gas filled type such as an R. C. A. #2051, having an anode 2, a cathode 3 of the filament heated type, a heater or filament 4, a control grid or electrode 5 and a screen grid 6. A source of current supply, such as a 110 v. alternating current circuit having conductors or lead wires 7, 8, the wire 7 being the "hot" line and the wire 8 bieng the "ground" line, are connected respectively to the anode 2 and cathode 3. Across the anode-cathode circuit, there is a step-down transformer 9 having its primary 10 connected by conductors 11, 12 to the wires 7, 8 respectively. The transformer has a secondary 13 preferably of say 24 v. and another secondary 14 preferably of 6 v. The cathode 3 is connected to the "ground" wire 8 by conductors 15, 16, 17 and 18. The anode 2 is connected to the "hot" wire 7 by conductors 19, 20 and 21. In the wire or conductor 19, there is a resistor 22 for a purpose to be described. The wires 20, 21 connect to the opposite ends of a relay coil 23 of a relay switch 24 forming the load in the anode-cathode circuit and having an armature 25 cooperable with a fixed contact 26 to control an external circuit 27, 28 for a burner motor, an electric valve, or the like. Connected to the ground connected wire 18, there is a wire 29 which is connected to one side of a fixed condenser 30 having its other side connected by wire 31 to the anode circuit wire 20. The resistor 22 and the condenser 30 cooperate to eliminate feedback of a note into the line or supply circuit. The screen grid 6 is connected to ground by a wire 32 having in series therein a resistor 33 to determine the negative bias of the screen grid 6 and connected by wire 16 to a wire 34 connected to ground. The filament 4 is connected to the transformer secondary 14 by wires 35, 36, the wire 35 being connected to the ground wire 34 by a wire 37. The transformer secondary 13 has one end isolated from ground by a fixed condenser 38, of say 0.1 MF capacity, connected in a conductor 39 connecting from the secondary 13 to the ground wire 37. The other terminal of the secondary is connected by a conductor 40 to one side of a variable condenser 41, of say 50 MMF capacity, having its other side connected by conductors 42, 43 to the control grid 5. The connection of the secondary 13 to the grid 5 is such that the current to the grid 5 is reversed relative to the current to the plate or anode 2 and is 180° out of phase with respect thereto. The variable condenser 41 further shifts the current flow so that the maximum negative potential on the grid 5 leads the maximum potential on the plate 2 by about 90° with the result that less negative swing or less negative potential on the grid 5 is required to block current flow through the tube 1. The grid conductor 43 is connected by a conductor 44 to the cathode 45 of a photocell 46 having its anode 47 connected to ground by a conductor 48. The cathode 45 is positioned for impingement of light rays thereon from any light source 49 which is to control the operation of the relay switch 24, such for example as a burner flame. In series in the conductor 44 there is a resistor 50, preferably of 5 megohms, which is positioned closely adjacent the tube 1 and serves to prevent capacitance in the circuit to the photocell 46 from rendering the grid 5 sufficiently less negative such as will cause the tube 1 to become conductive or "fire."

The operation of the system of Fig. 1 is as follows: When the line wires 7 and 8 are energized by an alternating current and there is no light or insufficient light from the source 49 on the photocell cathode 45, the grid 5 blocks current flow through the tube 1 and the relay coil 23. As noted above, the maximum negative potential on the grid 5 precedes the maximum potential on the plate 2 and as a result the tube is blocked by a decreasing negative potential, i. e. a potential becoming more positive as the potential across the anode-cathode increases. Accordingly, the tube 1 is extremely senitive and substantially balanced against current flow on each current surge of positive potential on the plate 2. As soon as sufficient light from the source 49 strikes the cell cathode 45 for a negative potential drain, the grid 5 is rendered sufficiently more positive or less negative such that the tube 1 will "fire" and permit current flow through the coil 23 sufficient to operate the armature 25 and close the relay switch.

Referring to Fig. 2, the electron tube 60 has a plate or anode 61, a cathode 62, a control electrode or grid 63, a screen grid 64, and a filament or heater 65 for the cathode 62. The anode 61 is connected to the "hot" side or conductor 66 of a 110 volt AC source having a "ground" wire or conductor 67. From the anode 61, a wire 68 having a resistor 69 in series therein is connected to a wire 70 connected to one terminal of a load or relay coil 71 having its other terminal connected by a wire 72 to the line wire or conductor 66. The coil 71 of the relay switch 73 actuates an armature 74 cooperable with a fixed contact 75 to control an external circuit having conductors 76, 77 forming part of the circuit of a burner motor (not shown), or the like. The cathode 62 is connected to the ground line or wire 67 by the wires 78 and 79. The screen grid 64 is also connected to the ground wire 67 by the wires 80, 81 and 79. The resistor 69 cooperates with a fixed condenser 82 having one side connected by wire 83 to the plate lead or wire 68 and having its other side connected to the ground wire 67 via wires 84, 85, 81 and 79 in order to prevent feedback to the main line. Across the main line wires 66, 67 there is a step-down transformer 86 having its primary 87 connected by wires 88, 89 so as to be in parallel with the anode-cathode circuit. The transformer has a filament secondary 90, preferably 6 v., which is connected by wires 91, 92 to the filament 65. The wire 91 is grounded by a wire 93. Another secondary coil 94, preferably of 24 v., is isolated at one terminal from ground by a fixed condenser 95, of say 0.1 mf capacity, which is connected in a wire 96 leading from the transformer secondary 94 to the lead wire 91. The other terminal of the secondary 94 is connected by a lead wire 97 to one side of a variable condenser 98, preferably of 50 m. m. f. capacity, having its other side connected to the control grid 63 by wires 99, 100. Connected to the grid lead 100 is the cathode 101 of a photocell 102 which is energized from a light source 103 which may be a fuel burner or other dominating device for the relay switch 73. The conductor 104 which connects the cell cathode 101 to the grid lead 100 contains a resistor 105, preferably of 5 megohms, positioned closely adjacent the tube 60 and serving to prevent capacitance in the external circuit to the photocell from rendering the grid 63 sufficiently less negative to "fire" the tube 60. The photocell anode 106 is connected by a wire or conductor 107 to the ground wire 67 via the wires 85, 81 and 79. A resistor 108 is positioned in the wire 107 to block reverse current flow.

The operation of the system of Fig. 2 will be apparent from the operation of the system of Fig. 1, above described.

Having thus described the invention, what is desired to be secured by Letters Patent of the United States is:

1. In an electric controlling system, an electro tube having an anode, a cathode and a control grid, a circuit connected to said anode and said cathode, loading means in said circuit, a step-down transformer having its primary in parallel with said loading means, the transformer secondary having one end isolated from ground and having its other end connected to said grid, a condenser interposed between said transformer other end and said grid, a photocell, a conductor connecting the photocell cathode to said grid, and a resistor in said conductor.

2. In an electric controlling system, an electron tube having an anode, a cathode and a control grid, a step-down transformer, a circuit connected to the primary of said transformer and to said anode and said cathode so that said primary is connected across the anode-cathode circuit, a conductor connecting one end of the transformer secondary to said grid so as to reverse the current flow to said grid relative to the current flow to said anode, a condenser in said conductor so that the maximum negative potential to said grid precedes the maximum potential to said anode, a condenser isolating the other end of said transformer from ground, a photocell, a conductor connecting the photocell cathode to said grid, a resistor in said last-named conductor, and a conductor connecting the photocell anode to ground.

FRED B. AUBERT.

REFERENCES CITED

The following references are of record in the file of this patent:

UNITED STATES PATENTS

| Number | Name | Date |
| --- | --- | --- |
| 1,650,092 | Poulsen et al. | Nov. 22, 1927 |
| 1,938,742 | Demarest | Dec. 12, 1933 |
| 1,988,658 | Kovalsky | Jan. 22, 1935 |
| 2,049,647 | Geffcken et al. | Aug. 4, 1936 |
| 2,140,350 | Dawson | Dec. 13, 1938 |
| 2,141,942 | Suits | Dec. 27, 1938 |